United States Patent [19]
Eisenhour

[11] Patent Number: 5,995,889
[45] Date of Patent: Nov. 30, 1999

[54] AUTOMATIC TEMPERATURE CONTROL METHOD AND APPARATUS FOR AN AUTOMOTIVE VEHICLE

[75] Inventor: Ronald S. Eisenhour, Phoenix, Ariz.

[73] Assignee: Nissan Research & Development, Inc., Farmington Hills, Mich.

[21] Appl. No.: 08/979,377

[22] Filed: Nov. 26, 1997

[51] Int. Cl.[6] .............................. F25B 29/00; F25B 49/02
[52] U.S. Cl. .............................. 701/36; 237/2 A; 62/131; 165/42; 165/43; 165/202
[58] Field of Search .............................. 701/36; 237/2 A; 165/202, 42, 43; 62/131

[56] References Cited

U.S. PATENT DOCUMENTS

| | | | |
|---|---|---|---|
| 4,419,730 | 12/1983 | Ito et al. .............................. | 364/424 |
| 4,901,788 | 2/1990 | Doi .............................. | 165/24 |
| 5,063,513 | 11/1991 | Shank et al. . | |
| 5,156,204 | 10/1992 | Doi .............................. | 165/17 |
| 5,226,595 | 7/1993 | Devera et al. .............................. | 237/2 A |
| 5,311,746 | 5/1994 | Dombrowski et al. .............................. | 62/131 |
| 5,742,920 | 4/1998 | Cannuscio et al. . | |
| 5,810,078 | 9/1998 | Knutsson et al. .............................. | 165/203 |
| 5,832,990 | 11/1998 | Eisenhour .............................. | 165/202 |

Primary Examiner—William A. Cuchlinski, Jr.
Assistant Examiner—Olga Hernandez

[57] ABSTRACT

An automatic vehicle interior temperature control system and control method wherein control system outlet air temperature can be controlled automatically using a processor with stored control algorithms that rely upon data including virtual ambient air temperature and virtual sun load heat flux.

7 Claims, 4 Drawing Sheets

AUTOMATIC TEMPERATURE CONTROL METHOD AND APPARATUS FOR AN AUTOMOTIVE VEHICLE

TECHNICAL FIELD

The invention relates to automotive vehicle temperature control systems and to a method for determining virtual ambient temperature and solar load.

BACKGROUND OF THE INVENTION

Automotive vehicle temperature control systems known in the art typically use ambient temperature sensors and sun load sensors to obtain information on exterior air temperature and solar energy load. The sensors typically are located at various locations in the vehicle. The information gathered from the sensors is used in a logic control system to establish airflow data and outlet temperature for the temperature control system in the vehicle passenger compartment.

The outside ambient air temperature sensor must be strategically placed so that it is positioned away from heat sources, such as the engine of the vehicle. A common location for the ambient temperature sensor is behind the forward radiator grille. This provides fair performance at high vehicle speeds but rather poor performance at lower vehicle speeds, especially if the vehicle is traveling in the direction of surface winds.

A typical location for a sun load sensor usually is in the upper vehicle dash surface where it may be subjected to shadows. It also, when so positioned, has poor directional sensitivity. That is, the sensitivity of the sun load sensor is variable depending upon the sun angle, which varies seasonally as well as hourly.

U.S. Pat No. 5,832,990, filed Nov. 30, 1995, discloses a temperature control system that takes into account airflow, as well as interior temperature, outlet temperature of the system and general comfort parameters while managing the total heat flux. It uses thermodynamic interaction of the comfort parameters, the interior temperature, the outlet temperature and airflow, as well as other control variables, in accordance with a control logic. As in the case of the prior art temperature control systems, the control system of the co-pending application requires a solar load sensor and an ambient temperature sensor.

SUMMARY OF THE INVENTION

The improved temperature control system and method of the invention uses a logic that determines the effective outside conditions (i.e., ambient temperature and sun load) in the control of the interior temperature. It does this without the requirement for either an ambient temperature sensor or a sun load sensor. Information regarding external conditions is obtained using a microcomputer to compute virtual ambient temperature and virtual sun load heat flux derived from a control logic within the ROM memory registers of the microcomputer. The information on the virtual external conditions is stored in RAM memory registers. In this way, precise control of airflow and control system outlet temperature in the vehicle passenger compartment is established.

It is an objective of the invention to eliminate the need for direct-reading ambient temperature sensors and sun load sensors thereby avoiding the limitations of such sensors due to their proximity to the engine or other heat sources or due to their location within the passenger compartment. The invention includes a temperature control system that provides virtual solar load information that is independent of shading of the vehicle and that is not affected by directional changes of the sun.

It is a further objective of the invention to eliminate the necessity for having solar load sensors and ambient temperature sensors, thereby reducing the cost of the system and simplifying system design and installation in an automotive vehicle.

The improved sensor logic of the invention relies upon thermal response of interior temperature to sun load and ambient temperature in the computation of virtual sun load and ambient temperature information. The improved control system of the invention, furthermore, is independent of vehicle speed. It is capable of providing precise information on external conditions even at low vehicle speeds.

The logic of the invention uses a thermodynamic model defined by functions and data stored within processor memory registers. It determines the vehicle interior temperature sensor response to ambient temperature and sun load and uses that information to estimate the collective effect of the sun load and the ambient temperature on the vehicle's interior temperature. The virtual ambient temperature and virtual sun load information obtained in this way may be used by the logic to solve automatic climate control equations in the same manner as prior art systems would use actual ambient temperature and actual sun load sensor inputs.

PARTICULAR DESCRIPTION OF THE INVENTION

Figure 1:
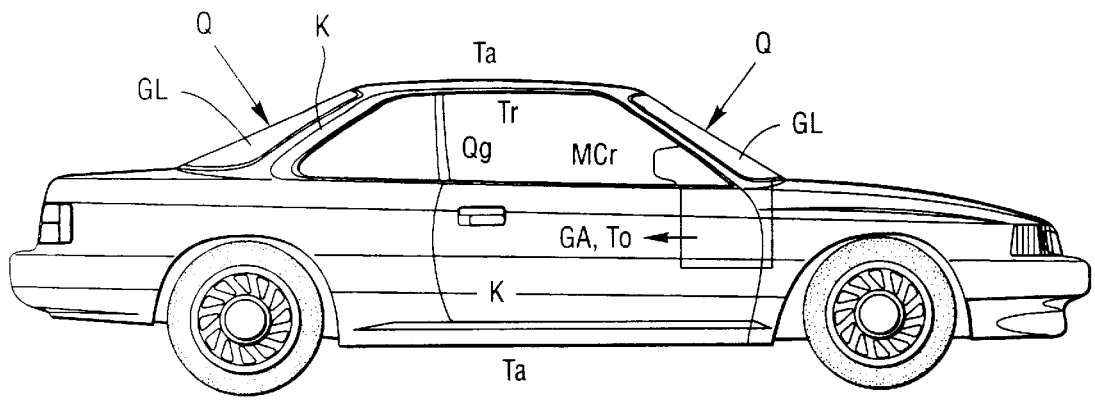
FIG. 1 is a schematic representation of a vehicle and the variables that affect the overall energy balance for the vehicle passenger compartment.

In FIG. 1, I have shown a contemporary automotive vehicle, together with the symbols that are used to identify the variables used in an automatic interior temperature control system embodying the improvements of the invention. The invention includes a microprocessor with a memory that contains an algorithm that comprehends the thermodynamic relationship of these variables and the interaction of one variable with respect to another in the control of heat flux. The symbols are identified as follows:

GL is the effective glass area for solar load transmission;

Q is the sun load heat flux;

K is a conduction/convection heat transfer coefficient between the vehicle passenger compartment and ambient;

$T_a$ is the ambient temperature;

$MC_r$ is the heat capacitance in the vehicle passenger compartment;

GA is the mass airflow rate (enthalpy rate per degree);

$\overline{GA}$ is the average mass airflow; and $T_o$ is the outlet temperature of the air delivered to the passenger compartment by the blower after passing through the heat exchangers of the temperature control system.

For the purpose of explaining the thermodynamic principles of ambient temperature and solar load estimation, the start-up condition for the interior temperature control system first will be discussed. During start-up, the energy balance of a soaked vehicle can be estimated in accordance with the following relationship:

$$K \cdot (T_r - T_a) = Q \cdot GL$$

where K is the conduction coefficient between the vehicle passenger compartment and ambient, Q is the sun load in kilowatts per square meter and GL is the effective glass area for radiant load transmission. During an energy balanced state, the external estimated conditions (EXTVIRT) equals:

$$\text{EXTVIRT} = T_a + Q \cdot \frac{GL}{K} = T_r$$

The interior airflow must be established to provide information regarding bulk heat transfer to the interior. For this reason, during the first few minutes of blower operation, the control system relies on this calculated value of EXTVIRT without adjustment.

Following start-up, the estimate of the external conditions during normal driving can be calculated. This requires a determination of the average outlet temperature, $T_o$, the steady state interior temperature, $T_{rss}$, and the average airflow, $\overline{GA}$. Each of these affects the determination of the external conditions.

For stabilized operation during normal driving, the following equation applies:

$$\text{EXTVIRT} = \left(1 + \frac{\overline{GA}}{K}\right) \cdot T_{rss} - \left(\frac{\overline{GA}}{K}\right) \cdot T_o$$

If this value for the external condition is substituted in the preceding energy balance equation, the following equation is derived:

$$\overline{GA} \cdot (T_{rss} - T_o) = K \cdot \left(T_a + Q \cdot \frac{GL}{K} - T_{rss}\right)$$

In order to solve this equation, the average airflow and outlet temperature must be known for a given time interval. This will be explained subsequently with respect to FIG. 4a.

The term $T_{rss}$ in the foregoing equations represents the average temperature in the vehicle passenger compartment during steady state operation of the interior temperature control system.

The airflow represented by the symbol GA can be determined by converting the driver's setting of the blower switch into a voltage. The voltage value then can be converted to a blower speed using an empirical relationship between voltage and blower speed that may be stored in the memory of the microprocessor.

In the case of a control system of the kind shown in the co-pending patent application identified above, the airflow would be determined as part of the heat flux calculation carried out by the processor using the interior temperature control algorithm disclosed in that patent application.

The determination of the steady state temperature in the interior of the vehicle ($T_{rss}$) is done by taking periodic samplings of room temperature ($T_r$) This information is used in the estimate of $T_{rss}$ during a given time interval. This process involves the use of a first order differential equation solution as follows:

$$T_2 = T_{ss} \cdot (1 - e^{-t/\tau}) + T_1 \cdot e^{-t/\tau}$$

where $T_2$ = The end of the interval temperature $T_{ss}$ = The steady state temperature $T_1$ = The start of interval temperature $\tau$ = The time constant t = The time of the interval e = The natural logarithm base The derivative of this solution yields:

$$dT_1 = [T_{ss} \cdot (1/\tau \cdot e^{-t/\tau}) + T_1 \cdot (-1/\tau \cdot e^{-t/\tau})] \cdot dt$$

For a finite interval (duration of $\Delta t$):

$$T_2 - T_1 = [T_{ss1} - T_1] \cdot (1/\tau \cdot e^{-(1/\tau)\Delta t}) \cdot \Delta t$$

If all $\Delta t$ values are equal for "n" small intervals:

$$T_n - T_1 = [\Sigma T_{ssi} - \Sigma T_{i-1}] \cdot (1/\tau) \cdot e^{-(1/\tau)\Delta t} \cdot \Delta t$$

$$T_n - T_1 = n \cdot [T_{(ss)avg} - T_{(i-1)avg}] \cdot (1/\tau \cdot e^{-(1/\tau)\Delta t}) \cdot \Delta t$$

But, $n \cdot \Delta t = \Delta t_{1-n}$. Thus, $$(T_n - T_1)/\Delta t_{1-n} = [T_{(ss)avg} - T_{(i-1)avg}] \cdot (1/\tau e^{31 \ (1/\tau)\Delta t})$$

If "$\Delta t/\tau$" is small, $e^{-(1/\tau)\Delta t}$ is $\cong 1$ (Note: The smallness of $\Delta t$ is arbitrary) then:

$$(T_n - T_1)/\Delta t_{1-n} = [T_{(ss)avg} - T_{(i-1)avg}] \cdot 1/\tau$$

Thus, $$T_{(ss)avg} = T_{(i-1)avg} + \tau \cdot (T_n - T_1)/\Delta t_{1-n}$$

This equation uses simple measurements and a time constant to estimate the steady state condition for a given time interval.

Figures 4A, 4B:
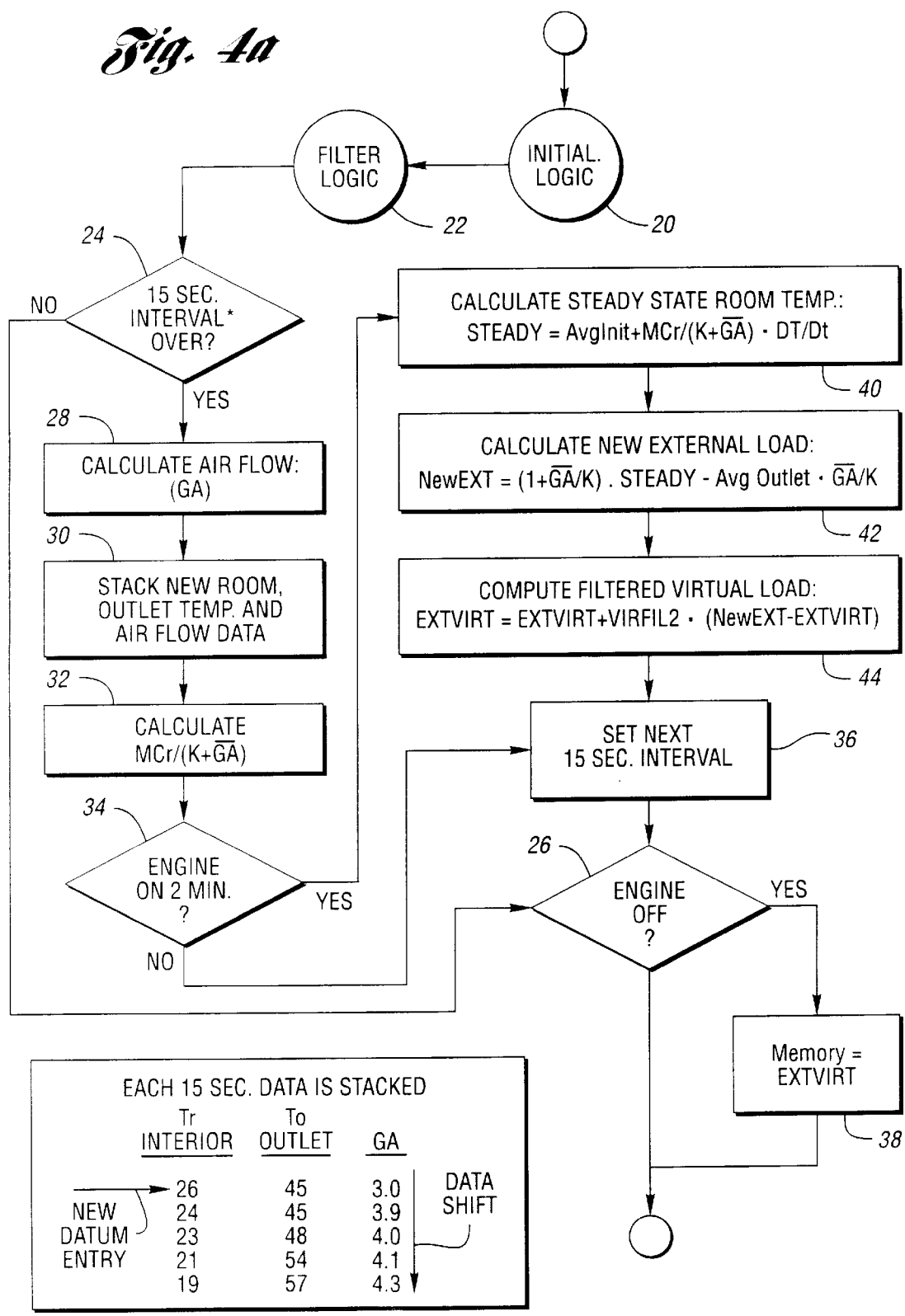
FIG. 4a is a flow chart illustrating the virtual external load logic carried out by the processor of the invention.
FIG. 4b is a memory stack example of recorded passenger compartment temperature, outlet temperature and airflow over a predetermined measuring time.

In the above equation, $T_{(ss)avg}$ equals the average temperature under steady state conditions in the interior of the vehicle passenger compartment. The term $T_{(i-1)avg}$ is the average of the first four temperature values that are stored in memory and stacked as shown in FIG. 4a. These are table values that are recorded during calculations at each 15 second interval over a period of one minute. The quantity ($T_n - T_1$) is the change in room temperature over a one minute period.

The earliest value for $T_o$ in the example illustrated in FIG. 4a is 57° C. and the recent value for $T_o$ is 45° C. The difference in these values represents an average temperature history over the preceding one minute interval, which is $\Delta t_{1-n}$. The one minute time interval and the 15 second time interval are arbitrary values that are chosen based on engineering judgment and empirical test data. As new data is entered into the top of the stack shown in FIG. 4a, the existing data is shifted down as the lowest entry is dropped.

The following equation results from the calculation of the steady state passenger compartment temperature.

$$T_{rss} = T_{riavg} + \Delta T_r \cdot \left[\frac{MC_r}{K + \overline{GA}}\right] / \Delta t$$

In the foregoing equation, $MC_r$ is the effective interior heat capacitance, $\Delta T_r$ is the change in room temperature for a given time interval. $Tr_{iavg}$ is the average of all but the last room temperature measurement during the time interval. Sampling of the temperature during the time interval (i.e., $\Delta t$) is necessary. A sample rate of one sample for each 15 seconds is used to help determine the value of $T_{rss}$ during the preceding minute ($\Delta t$).

Under unusual conditions where there are unwanted fluctuations in the response to the external conditions, a filtering logic is used periodically to limit the fluctuations. These fluctuations might occur, for example, when a vehicle passenger compartment door is opened and closed or when a window is opened and closed.

When an unusual change in heat flux occurs during such transient conditions, the interior temperature sensors may not correlate correctly with the actual passenger compartment temperature. The following filtering logic is applied periodically to limit the incorrect fluctuations of the response to external conditions.

EXTVIRT(old)=EXTVIRT(old)+M·EXTVIRT(new) or

EXTVIRT=EXTVIRT+VIRFIL2 ·(NewEXT - EXTVIRT), where: 1>M>0, EXTVIRT(old) =computed EXTVIRT in the previous control loop during steady state operation, and EXTVIRT (old)=computed EXTVIRT at the end of the current control loop during steady state operation.
This filtering logic will be explained with reference to FIG. 6.

Under unusual start-up conditions, a special logic is used in the determination of the response to external conditions. If the soak time is very short, the room temperature may not be stabilized (i.e., $T_r$ does not equal $T_a+Q·GL/K$). The EXTVIRT value under these circumstances can be represented by the value stored in memory during the last driving mission. If the vehicle is cooling to the ambient temperature after a driving mission, stabilization may take a long time. Thus, a temperature offset is taken away from the room temperature and used in the estimate of EXTVIRT. This will be explained with reference to FIG. 5. This effect has an advantage during warm-up performance, even for a completely soaked vehicle.

If the vehicle is soaking to a hot condition, the sensor used to measure interior passenger compartment temperature provides the best estimate of interior passenger compartment temperature.

In previously cold conditions without a long soak, the logic assumes that the remembered value for EXTVIRT is the best estimate.

Figure 2:
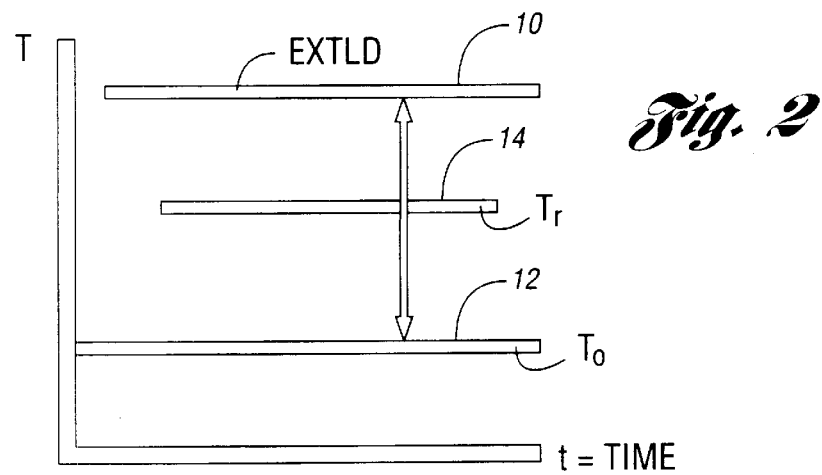
FIG. 2 is a graph illustrating the relationship of external load, outlet temperature and interior temperature over a period of time.

FIG. 2 shows a thermal balance chart where temperatures are plotted against time. Under any given conditions, the external load can be represented by horizontal line 10 and the outlet temperature for the automatic interior temperature control system can be represented by the horizontal line 12.

The calculated temperature in the interior of the vehicle passenger compartment then would fall between lines 10 and 12, as shown at 14. Of course, the external load can be below interior temperature and the outlet temperature. Nevertheless, the stabilized room temperature will be between the two.

Figure 3:
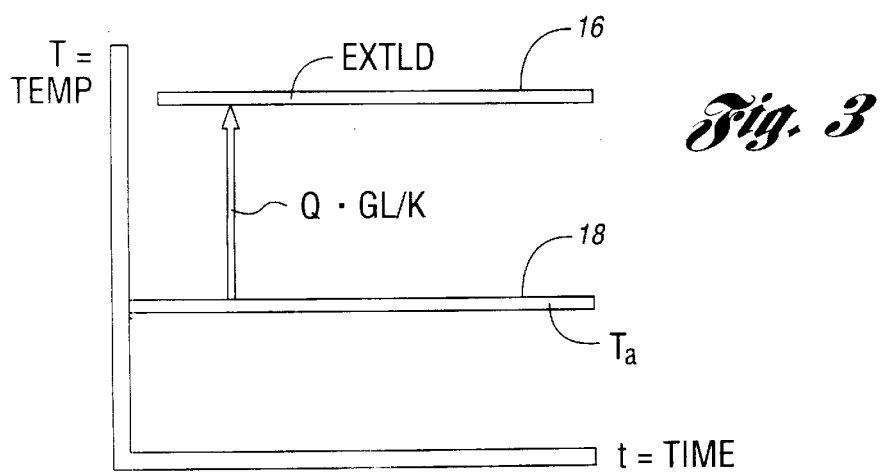
FIG. 3 is a graph showing the combined effect of sun load and ambient temperature over a period of time.

FIG. 3 shows the relationship of the external load over a given time period. The external load line 16 is higher than the ambient temperature line 18 due to the effect of sun load. This Figure shows the temperature (which equals the EXTLD temperature) that the interior air will achieve if the vehicle is soaked in the outside condition for a very long time.

Referring next to the flow chart of FIG. 4a, the virtual external load logic now will be described. The control routine of the processor begins with an initialization logic at 20. This will be described with reference to FIG. 5. The processor then enters a filter logic routine at 22, which will be described with reference to FIG. 6. The next step at 24 involves an inquiry as to whether the 15-second interval described previously is over. If it is not over, the routine will inquire at 26 whether the engine is turned off. If the engine is running, the routine then will proceed at the beginning step of the logic where initialization occurs at 20 and a filtering logic is carried out at 22. If the 15-second interval has terminated, a calculation of airflow takes place at action block 28. This involves a calculation of airflow, as explained previously. In certain temperature control systems, this can be done, as explained previously, by referring to a functional relationship between blower voltage determined by the driver's selection of blower motor speed and airflow based on empirical test data.

The outlet temperature $T_o$ and the airflow data are computed at action block 30 in accordance with the equations described previously. This information then is transferred to a memory stack as shown at FIG. 4b. This is done at each 15-second interval. The newest data stacked in the memory, as indicated in FIG. 4b, is entered at the top of the stack. The average temperature then is the average of the four most recently stored readings. In an example shown in FIG. 4b, the average of initial room temperatures (AvgInit) is the average of 19° C., 21° C., 23° C. and 24° C. The average outlet temperature $T_o$ would be the average of the four most recently stored values: 45° C., 45° C., 48° C. and 54° C. The corresponding airflow ($\overline{GA}$) is calculated similarly in cubic meters per minute using the values 3.0, 3.9, 4.0 and 4.1.

The routine then proceeds to action block 32, where the interior heat capacitance is calculated in accordance with the equations described previously. A determination then is made at step 34 to determine whether the engine is running and whether it has been running for at least two minutes, which is an arbitrary time established by test data. If it has not been running for at least two minutes, the routine will proceed to action block 36 where the next 15-second interval is set so that the previously described steps of the routine can be repeated. If the engine still is running as determined at step 26, the routine then will proceed to the beginning, where initialization logic will be confirmed to have been completed. If the engine is off, the external conditions (EXTVIRT) will be stored in memory where it will be made available for the next operating cycle, as shown at 38.

If the inquiry at step 34 is positive, the engine will have been running for at least two minutes. The routine then will proceed directly to action block 40 where the steady state room temperature is calculated. This is done as previously described in accordance with the equation indicated above for $T_{rss}$. The routine then will calculate a new external load at action block 42 in accordance with the relationship NewEXT=(1+$\overline{GA}$/K)·Steady—Average Outlet·$\overline{GA}$/K, where $\overline{GA}$ is the average airflow. The filtering calculation then is carried out at action block 44, as will be explained with reference to FIG. 6. This is done in accordance with the equation:

$$EXTVIRT = EXTVIRT + VIRFIL2 \cdot (NewEXT - EXTVIRT)$$

The value for the filtered virtual load then is stored in memory as shown at action block 38 after the engine is turned off, as confirmed at block 26, and after the next 15-second interval is set as shown at 36. This EXTVIRT value is stored in RAM where it can be used during the next driving mission.

Figure 5:
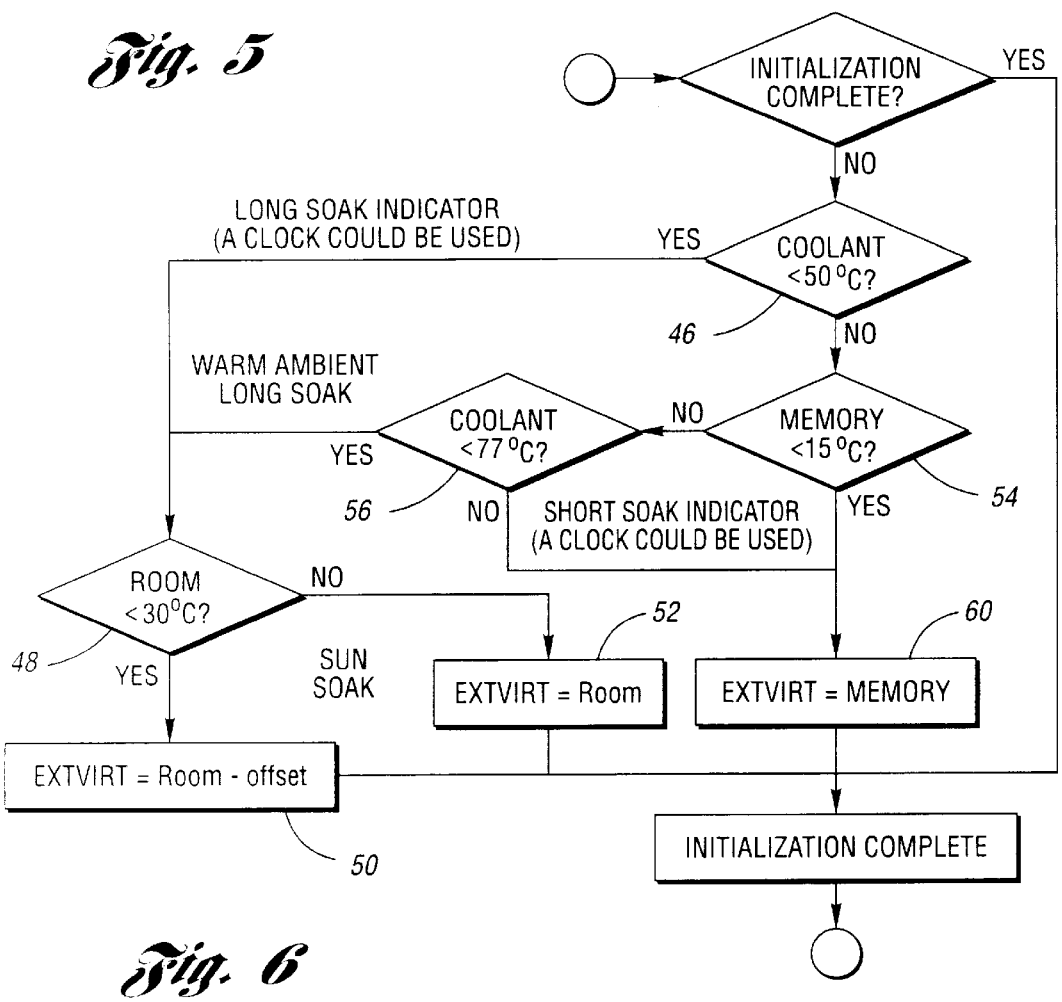
FIG. 5 is a flow chart illustrating the control logic for start-up conditions.

The initialization logic that is carried out at step 20 in the flow chart at FIG. 4a is illustrated in flow chart form in FIG. 5.

Before the virtual external load logic can be carried out, the initialization routine proceeds to determine at step 46 whether the engine coolant is less than 50° Centigrade. If it is less than 50° Centigrade, that would indicate that the vehicle has been sitting for a long time after the engine was shut down following the previous mission. If the vehicle engine has indeed cooled down to a value less than 50°, a determination at step 48 is made to determine whether the room temperature is less than 30° Centigrade. If it is less than 30, that would indicate that the vehicle, on initial start-up, has not been soaking in the sun. The routine then will proceed to action block 50 where the value for EXTVIRT stored in memory is equal to room temperature minus an offset of a predetermined value such as 5°. Thus, a lower passenger compartment temperature is used in the load calculation to provide a more gentle response.

If the temperature on initial start-up is over 30° Centigrade, that indicates that the vehicle has been soaking in the sun and has accumulated a sun load. Under those conditions, the stored value for EXTVIRT is chosen as shown at action block 52. Thus, this portion of the routine is a long soak indicator.

If the engine coolant is greater than 50°, that indicates that the engine has not been shut down for a long time. In that event, the routine will proceed to step 54 where the memory is accessed to obtain the stored value for temperature. If the memory value stored at the end of the execution of the preceding logic is greater than 15° Centigrade, a test is then made at step 56 to determine whether the coolant temperature is less than 77° Centigrade. If the coolant temperature is less than 77° Centigrade, the routine then will proceed to step 48. If the engine coolant temperature is higher than 77°, the routine will use in the load logic the value for EXTVIRT stored in memory. This is indicated at 60.

If the room temperature is higher than 30° Centigrade, the value for EXTVIRT is the same as the measured interior temperature $T_r$. That value then is used in the previous external load logic routine as shown in FIG. 4a.

As indicated in the foregoing description of FIG. 5, it is determined at the outset of the routine of FIG. 5 whether the vehicle has been soaking for a long time or a short time. This information affects the sequence of the method steps illustrated in FIG. 5.

Figure 6:
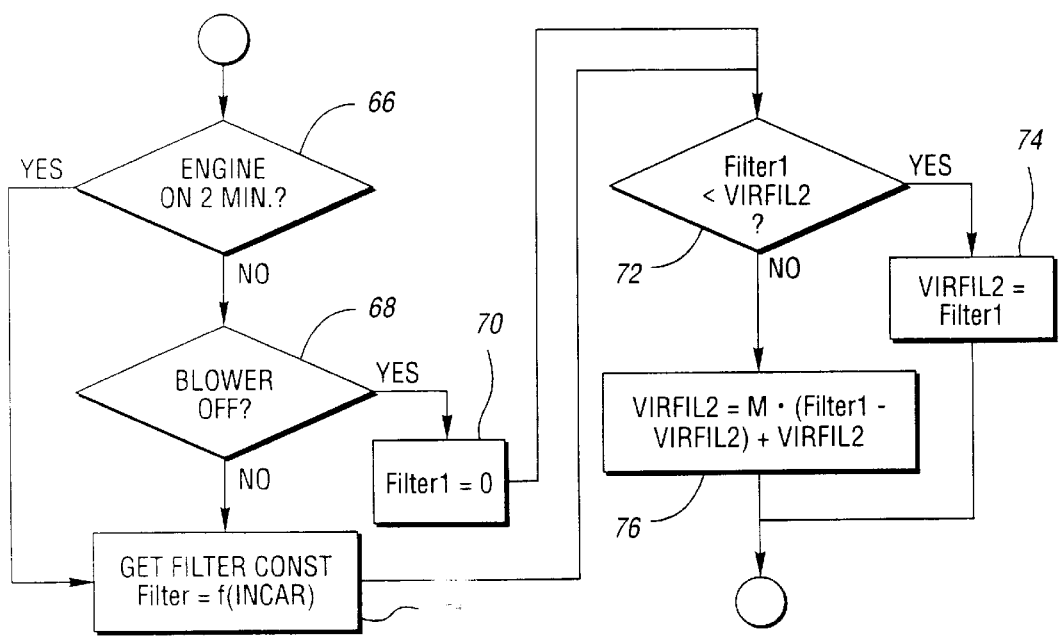
FIG. 6 is a flow chart illustrating a filter logic for dealing with unwanted fluctuations of the external virtual conditions that are due to improper responses of interior temperature sensors to changing actual room temperature.

The filter constant logic for EXTVIRT is shown in FIG. 6. This logic is used at the beginning of the routine shown in FIG. 4a. A test is made at step 66 to determine whether the engine has been running for at least two minutes. As in the case of the other time intervals, a period of two minutes is an arbitrary value established by engineering judgment and empirical data obtained by test. This time period gives the system sufficient time to gather data to carry out the load logic calculations. It takes one minute, for example, to obtain the average interior temperature, outlet temperature and airflow value stacked in the memory registers indicated in FIG. 4a. It also provides the engine sufficient time to develop warm water for use by the temperature control system.

If the engine has not been running for two minutes, a test is made to determine whether the blower is on or off as shown at 68. If the blower is off, the routine at action block 70 will set the filter constant Filter1=0 in the computation at action block 44 in the external load logic computation routine of FIG. 4a. A test is made then at step 72 to compare filter constant Filter1 with the virtual filter constant VIRFIL2. Since Filter1 is zero, a positive response at step 72 will require that the comparison between the two filter constants at action block 74 will be the same. Thus, both the filter constants would be zero and the external load logic then will proceed as indicated in FIG. 5. If Filter1 is greater than VIRFIL2, the routine will proceed to action block 76 where a calculation is made to make sure that VIRFIL2 increases in value so that it will match Filter1. This is done using the equation VIRFIL2=M·(Filter1−VIRFIL2)+VIRFIL2, where M is a multiplier between 0 and 1.

The filter constants are obtained at action block 71 in FIG. 6 and compared at step 72. These values for filter constants, which are obtained from a look-up table stored in ROM, are based on interior temperature $T_r$. The look-up table is shown in FIG. 7.

Figure 7:
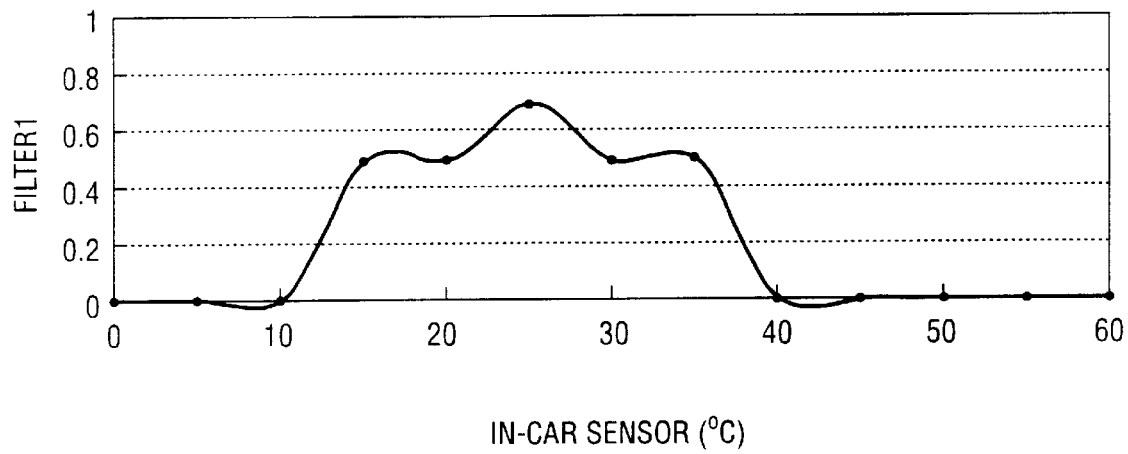
FIG. 7 is a graph showing the relationship of a filter constant (Filter 1) and interior temperature.
Figure 8:
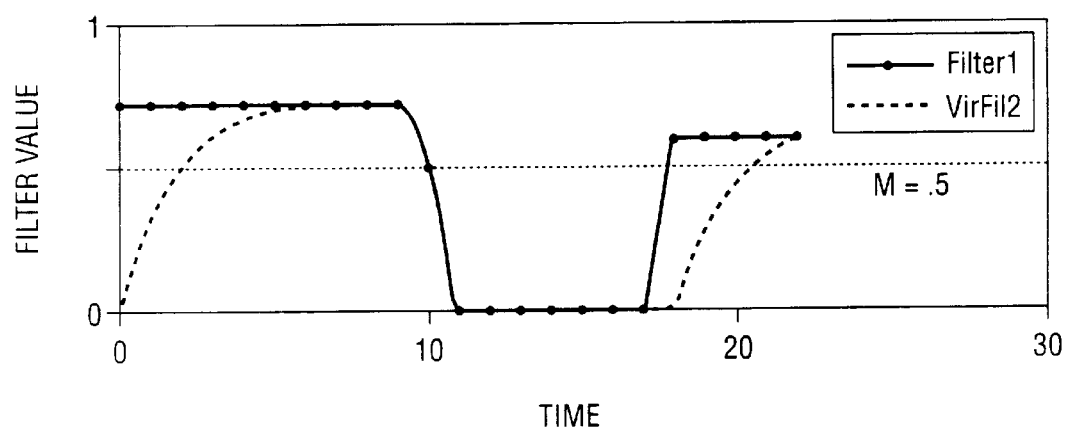
FIG. 8 shows the relationship of filter constant Filter 1 and time and the corresponding relationship of virtual filter constant VirFil2.

FIG. 7 shows a graph of the filter constants plotted against $T_r$. FIG. 8 shows how the effective filter constant can be changed as the interior temperature suddenly increases or decreases. If the duration of the filter constant response is short, the value for VIRFIL2 will rise until it matches Filter1. The gradual increase in VIRFIL2 is due to multiplier M. The same is true if the response time is long. If the filter constant from the look-up table (Filter1) should decrease below VIRFIL2, VIRFIL2 will immediately decrease without a gradual response.

Although a preferred embodiment of the invention has been disclosed, it will be apparent that modifications to the invention may be made by persons skilled in the art without departing from the scope of the invention. The following claims are intended to cover all such modifications, as well as equivalents of the invention.

What is claimed is:

1. A temperature control system for an automotive vehicle having an air blower in the vehicle passenger compartment and an electronic processor with ROM memory registers for storing control algorithms and RAM memory registers for storing measured and computed control data;

control data sensors for obtaining temperature and sun load information including air temperature in the passenger compartment;

said ROM memory registers containing stored functional relationships between mass airflow for said blower, steady state passenger compartment temperature, ambient temperature and sun load heat flux;

means for obtaining mass airflow rate data for storage in RAM memory registers;

said processor including a central processor unit with logic portions for computing virtual ambient temperature and virtual sun load using said stored control data; and said processor logic portions computing blower outlet temperature using said virtual ambient temperature, said virtual sun load and said mass airflow rate data whereby the collective effect of sun load and ambient temperature is obtained without direct reading sun load and ambient temperature sensors.

2. A method for controlling air temperature within a vehicle passenger compartment having an automatic temperature control system with an air blower and an electronic processor that responds to external conditions including sun load heat flux and ambient air temperature to effect adjustments in air temperature at the outlet side of said blower, said method comprising the steps of:

determining air temperature at the air outlet side of said blower;

determining mass airflow rate for said blower;

computing effective heat capacitance of air within the vehicle passenger compartment;

determining the change in room temperature during a pre-determined time interval; and estimating ambient air temperature and sun load heat flux using an energy balance equation stored in memory portions of said processor.

3. The method set forth in claim 2 wherein said energy balance equation for a soaked vehicle is expressed as $$EXTVIRT = T_a + Q \cdot GL/K = T_r$$

wherein K=the conduction coefficient between vehicle interior temperature ($T_r$) and ambient air temperature ($T_a$);

Q=sun load (watts/m$^2$);

GL=the effective glass area for radiant load transmission; and

EXTVIRT=virtual external conditions, which is the combined effect of sun load and ambient air temperature.

4. The method set forth in claim 3 including the steps of periodically computing sample vehicle interior temperature data ($T_r$) and using that data to compute estimated vehicle interior temperatures under steady state conditions ($T_{rss}$);

obtaining an average of multiple samples of the interior temperature ($T_r$); and computing EXTVIRT using said energy balance equation and said steady state $T_{rss}$ value.

5. The method set forth in claim 3 wherein said computation of said steady state interior temperature involves solving the following equation:

$$T_{rss} = Tr_{iavg} + \Delta T_r \times [MC_r/(K+\overline{GA})]/\Delta t$$

wherein $MC_r$=the effective interior heat capacitance;

$\Delta T_r$=the change in interior temperature during a given time interval;

$Tr_{iavg}$=the average of all but the last room temperature measurement during the given time interval; and $\overline{GA}$ is the average airflow.

6. The method set forth in claim 5 including the step of modifying the computed value for EXTVIRT using a filtering logic multiplier (M) in accordance with the following equation:

$$EXTVIRT(old) = EXTVIRT(old) + M \cdot [EXTVIRT(new) - EXTVIRT(old)]$$

wherein 1>M>0;

EXTVIRT (old)=the computed EXTVIRT in the previous control loop during steady state operation; and EXTVIRT (new)=the computed EXTVIRT at the end of the current control loop during steady state operation whereby fluctuations of EXTVIRT due to unreliable interior temperature data ($T_r$) are reduced.

7. The method set forth in claim 6 including the steps of determining soak time for the vehicle; and substituting the EXTVIRT value from a previous operating interval for the EXTVIRT value computed during the current operating interval when the soak time is less than a pre-determined time value.

* * * * *

UNITED STATES PATENT AND TRADEMARK OFFICE
CERTIFICATE OF CORRECTION

PATENT NO.   : 5,995,889
DATED        : November 30, 1999
INVENTOR(S)  : Ronald S. Eisenhour It is certified that error appears in the above-identified patent and that said Letters Patent is hereby corrected as shown below:

Column 1,
Line 43, delete "co-pending application", and substitute --'990 patent--.

Column 3,
Line 41, delete "$T_{res}$" and substitute --$T_{rss}$--.

Column 4,
Line 6, delete "co-pending patent application", and substitute --'990 patent--.
Line 9, delete "application".
Line 12, after ($T_r$) insert a period (.).
Lines 35-46, after "small intervals:" and before "Thus,", delete the text and formulas, and substitute the following:

$$T_n - T_1 = [\sum T_{ssi} - \sum T_{i-1}] \cdot (1/\tau \cdot e^{-(1/\tau)\Delta t}) \cdot \Delta t$$
$$T_n - T_1 = n \cdot [T_{(ss)avg} - T_{(i-1)avg}] \cdot (1/\tau \cdot e^{-(1/\tau)\Delta t}) \cdot \Delta t$$
Let, $n \cdot \Delta t = \Delta t_{1-n}$. Thus,
$$(T_n - T_1)/\Delta t_{1-n} = [T_{(ss)avg} - T_{(i-1)avg}] \cdot (1/\tau \cdot e^{-(1/\tau)\Delta t})$$
If "$\Delta t/\tau$" is small, $e^{-(1/\tau)\Delta t}$ is $\cong 1$ (Note: The smallness of $\Delta t$ is arbitrary) then:
$$(T_n - T_1)/\Delta t_{1-n} = [T_{(ss)avg} - T_{(i-1)avg}] \cdot 1/\tau$$

Line 64, delete "C." and substitute --C--.

Column 5,
Line 15, delete "$Tr_{iavg}$", and substitute --$T_{riavg}$--.
Line 33, delete "EXTVIRT(old)=EXTVIRT(old) + M · EXTVIRT(new)", and substitute --EXTVIRT(old)=EXTVIRT(old) + M· [EXTVIRT(new) - EXTVIRT(old)]--.

Column 6,
Lines 42 and 44, change "C." to --C,-- at each occurrence, but retain the periods at the end of each sentence

UNITED STATES PATENT AND TRADEMARK OFFICE
CERTIFICATE OF CORRECTION

PATENT NO. : 5,995,889  
DATED : November 30, 1999  
INVENTOR(S) : Ronald S. Eisenhour Page 2 of 2

It is certified that error appears in the above-identified patent and that said Letters Patent is hereby corrected as shown below:

Column 7,
Line 2, please correct the formula to read:

$$\text{NewEXT} = (1 + \overline{GA/K}) \cdot \text{Steady} - \text{Average outlet} \cdot \overline{GA/K}$$

Line 27, change "30" to --30°C--.

Claim 5, Column 10,
Line 8, delete "$Tr_{iavg}$", and substitute --$T_{riavg}$--.
Line 15, delete "$Tr_{iavg}$", and substitute --$T_{riavg}$--.

Signed and Sealed this

Twenty-eighth Day of August, 2001

*Attest:*

*Attesting Officer*

NICHOLAS P. GODICI
*Acting Director of the United States Patent and Trademark Office*